(12) United States Patent
Jeong et al.

(10) Patent No.: US 9,395,568 B2
(45) Date of Patent: Jul. 19, 2016

(54) LIQUID CRYSTAL DISPLAY DEVICE

(71) Applicant: LG Display Co., Ltd., Seoul (KR)

(72) Inventors: Hae-Hyeon Jeong, Gyeongsangbuk-do (KR); Seung-Hoon Yang, Daegu (KR); Won-Tae Kim, Daegu (KR); Min-Woo Kim, Gumi-si (KR); Kwang-Min Lee, Suwon-si (KR); Mi-Ra Kim, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/451,720

(22) Filed: Aug. 5, 2014

(65) Prior Publication Data

US 2015/0241731 A1 Aug. 27, 2015

(30) Foreign Application Priority Data

Feb. 27, 2014 (KR) ........................ 10-2014-0023470

(51) Int. Cl.
*G02F 1/1333* (2006.01)
*F21V 8/00* (2006.01)
(Continued)

(52) U.S. Cl.
CPC ............ *G02F 1/133308* (2013.01); *B32B 7/12* (2013.01); *G02B 6/009* (2013.01); *G02B 6/0051* (2013.01); *G02B 6/0073* (2013.01); *G02B 6/0088* (2013.01); *G02B 6/0091* (2013.01); *G02F 1/133528* (2013.01); *G02F 1/133615* (2013.01); *B32B 2405/00* (2013.01); *G02F 2001/133314* (2013.01); *G02F 2001/133317* (2013.01); *G02F 2001/133322* (2013.01); *G02F 2001/133531* (2013.01);
(Continued)

(58) Field of Classification Search
CPC .................... G02F 1/133528; G02F 1/133602; G02F 2001/133311–2001/133334; G02F 2001/133531
See application file for complete search history.

(56) References Cited

U.S. PATENT DOCUMENTS

2006/0044779 A1 3/2006 Lee
2009/0009684 A1 1/2009 Hsiao
(Continued)

FOREIGN PATENT DOCUMENTS

| EP | 2551717 A2 | 1/2013 |
|---|---|---|
| KR | 10-2013-0032056 A | 4/2013 |
| KR | 10-2013-0073398 A | 7/2013 |

OTHER PUBLICATIONS

European Patent Office, Search Report and Opinion, European Patent Application No. 15151878.4, Jul. 6, 2015, eight pages.
(Continued)

*Primary Examiner* — Mariceli Santiago
(74) *Attorney, Agent, or Firm* — Fenwick & West LLP

(57) ABSTRACT

A liquid crystal display device includes a liquid crystal panel including first and second substrates and a liquid crystal layer between the first and second substrates; a backlight unit under the liquid crystal panel; a bottom frame including a horizontal surface and first, second, third, and fourth side surfaces, the first side surface corresponding to a first edge of the liquid crystal panel and being opposite to the second side surface, wherein the liquid crystal panel has a size larger than the bottom frame such that a side of the liquid crystal panel protrudes beyond the bottom frame; a main frame including a first guide portion corresponding to the first edge and a second guide portion corresponding a second edge of the liquid crystal panel opposite to the first edge; and an adhesive covering the side of the liquid crystal panel and an outer side of the third and fourth side surfaces.

19 Claims, 4 Drawing Sheets

(51) Int. Cl.
*G02F 1/1335* (2006.01)
*B32B 7/12* (2006.01)
*G06F 1/16* (2006.01)

(52) U.S. Cl.
CPC ........ *G02F 2201/08* (2013.01); *G02F 2201/46* (2013.01); *G02F 2202/28* (2013.01); *G06F 1/1601* (2013.01)

(56) References Cited

U.S. PATENT DOCUMENTS

| | | | |
|---|---|---|---|
| 2009/0310055 A1* | 12/2009 | Kim | G02F 1/133528 349/153 |
| 2011/0187692 A1 | 8/2011 | Jung | |
| 2011/0227848 A1* | 9/2011 | Furusawa | G06F 1/1626 345/173 |
| 2011/0235364 A1 | 9/2011 | Lo et al. | |
| 2011/0260959 A1* | 10/2011 | Son | G02F 1/133308 361/679.01 |
| 2011/0261283 A1* | 10/2011 | Kim | H04N 5/2257 349/58 |
| 2012/0264345 A1* | 10/2012 | Yoon | G02F 1/1303 445/25 |
| 2012/0281383 A1* | 11/2012 | Hwang | G02F 1/133308 361/807 |
| 2013/0010411 A1 | 1/2013 | Wu et al. | |
| 2013/0027857 A1* | 1/2013 | Jeong | G02F 1/133308 361/679.01 |
| 2013/0236680 A1* | 9/2013 | Ahn | G02F 1/133308 428/68 |
| 2014/0043558 A1 | 2/2014 | Hwang et al. | |
| 2014/0204293 A1* | 7/2014 | Kim | G02F 1/133351 349/58 |

OTHER PUBLICATIONS

Korean Intellectual Property Office, Office Action, Korean Patent Application No. 10-2014-0023470, Jan. 26, 2015, five pages [with concise explanation of relevance in English].

* cited by examiner

LIQUID CRYSTAL DISPLAY DEVICE

CROSS-REFERENCE TO RELATED APPLICATION

The present application claims the benefit of Korean Patent Application No. 10-2014-0023470, filed in Korea on Feb. 27, 2014, which is hereby incorporated by reference.

BACKGROUND OF THE INVENTION

1. Field of the Invention

The present invention relates to a liquid crystal display (LCD) device, and more particularly, to a low-weight LCD device having a thin profile and a narrow bezel.

2. Discussion of the Related Art

Display devices represent electrical signals as visual images. Particularly, LCD devices and organic light emitting diode (OLED) display devices are flat panel display devices having characteristics of light weight, thin profile, and low power consumption relative to cathode-ray tube display devices.

Among these devices, since LCD devices display moving images with a high contrast ratio, LCD devices have been widely used.

An LCD device includes a liquid crystal panel. Two substrates with a liquid crystal layer therebetween are attached to form the liquid crystal panel. The alignment of the liquid crystal molecules is changed by an electric field generated in the liquid crystal panel such that images can be displayed by controlling light transmissivity.

Since the liquid crystal panel does not include a light source, the LCD device includes a light source. As a result, a backlight unit including the light source is disposed under the liquid crystal panel.

A main frame surrounds side surfaces of the liquid crystal panel and the backlight unit, and a top frame covers a front edge of the liquid crystal panel. A bottom frame covers a rear surface of the backlight unit. The main frame, the top frame, and the bottom frame are combined for assembly.

Recently, the LCD device has been used as the monitor of desktop computers and portable computers as well as a wall-mounted television. It is beneficial to develop LCD devices having a large display area, low weight, and low volume.

However, the many elements in the LCD device limit the device's lightness and slimness. In addition, the complex assembly process increases assembly time. Large display areas are limited, particularly in narrow-bezel-type LCD devices.

SUMMARY OF THE INVENTION

Accordingly, the present invention is directed to an LCD device that substantially obviates one or more of the problems due to limitations and disadvantages of the related art.

The present invention provides an LCD device having a narrow bezel.

The present invention also provides for more secure assembly of an LCD device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the present invention provides a liquid crystal display device with a liquid crystal panel including first and second substrates and a liquid crystal layer between the first and second substrates; a backlight unit under the liquid crystal panel; a bottom frame including a horizontal surface and first, second, third, and fourth side surfaces, the first side surface corresponding to a first edge of the liquid crystal panel and being opposite to the second side surface, wherein the liquid crystal panel has a size larger than the bottom frame such that a side of the liquid crystal panel protrudes beyond the bottom frame; a main frame including a first guide portion corresponding to the first edge and a second guide portion corresponding a second edge of the liquid crystal panel opposite to the first edge; and an adhesive covering the side of the liquid crystal panel and an outer side of the third and fourth side surfaces.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 1:
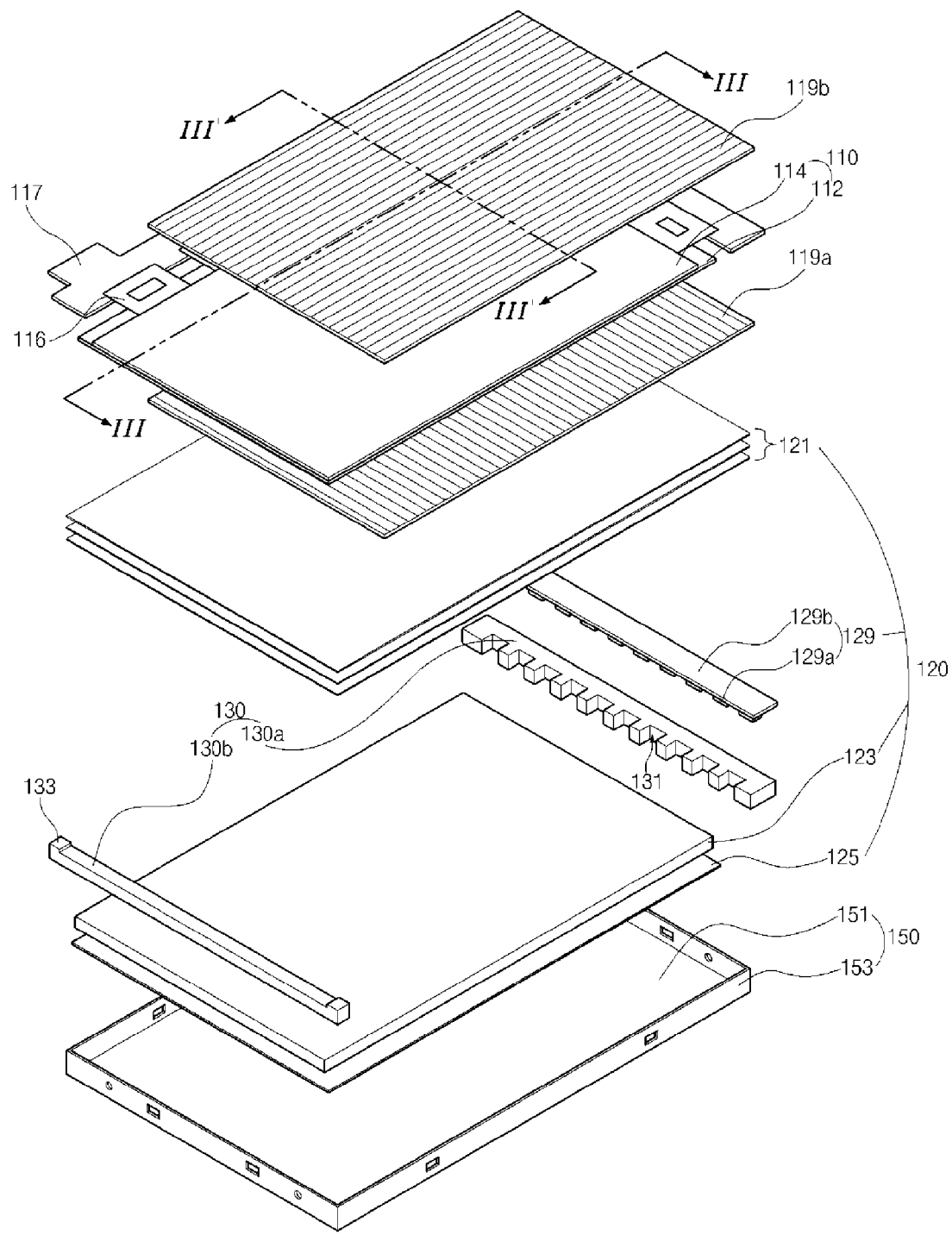
FIG. 1 is an exploded perspective view of an LCD device according to a first embodiment of the present invention.

FIG. 1 is an exploded perspective view of an LCD device according to a first embodiment of the present invention.

As shown in FIG. 1, an LCD device includes a liquid crystal panel 110, a backlight unit 120, a main frame 130, and a bottom frame 150.

The liquid crystal panel 110 includes first and second substrates 112 and 114 facing each other and a liquid crystal layer (not shown) therebetween.

In an active matrix type, array elements, for example, a gate line (not shown), a data line (not shown), a thin film transistor (not shown), and a pixel electrode (not shown), are formed on the first substrate 112. The gate and data lines cross each other to define a pixel region, and the thin film transistor is formed at a crossing point of the gate and data lines. The pixel electrode is disposed in the pixel region and is connected to the thin film transistor.

In addition, a black matrix (not shown) corresponding to the gate line, the data line, and the thin film transistor to block light and a color filter layer (not shown) having red, green and blue colors are formed on the second substrate 114. A common electrode (not shown) is also formed on the second substrate 114 to generate an electric field with the pixel electrode on the first substrate 112.

Moreover, first and second polarizing plates 119a and 119b for selectively transmitting light are positioned on outer sides of the first and second substrates 112 and 114, respectively.

The liquid crystal panel 110 is connected to a printed circuit board (PCB) 117 through a connection member 116, such as a flexible circuit board or a tape carrier package (TCP), and the printed circuit board 117 extends along a side surface of the main frame 130 or a rear surface of the bottom frame 150.

When a thin film transistor is in an ON state (trigged by a scanning signal from the gate driving circuit), an image signal is applied to the pixel electrode through the data line to produce an electric field between the pixel electrode and the common electrode. As a result, as the intensity or direction of the electric field is changed, the alignment of the liquid crystal molecules in the liquid crystal layer also changes such that light transmissivity is controlled.

To display images using controlled light transmissivity, the backlight unit 120 provides light to the liquid crystal panel 110 and is disposed at a rear side of the liquid crystal panel 110.

The backlight unit 110 includes a light emitting diode (LED) assembly 129 as a light source, a reflective sheet 125 of white or silver color, a light guide plate 123 on the reflective sheet 125 and an optical sheet 121 on or over the light guide plate 123.

The LED assembly 129 is positioned at one side of the light guide plate 123 and includes at least one LED 129a and a printed circuit board (PCB) 129b where the LED 129a is disposed.

A direction of the light from the LEDs 129a is substantially parallel to a surface of the PCB 129b. This may be referred to as a side view type LED assembly.

The LEDs 129a emit red, green and blue color light. The LEDs 129a are simultaneously turned on and off such that white light can be provided from the LEDs 129a by color mixture.

To improve the optical efficiency and the brightness, an LED including a blue LED chip and a yellow fluorescent substance, e.g., cesium-doped yttrium-aluminum-garnet (YAG:Ce), may be used.

The blue light from the blue LED chip is mixed with the yellow light from the yellow fluorescent substance such that the white light is provided.

The light emitted from the LED 129a is incident to the light guide plate 123 and refracted or reflected to be dispersed onto a wide region of the light guide plate 123. The light is processed into a planar light source and provided onto the liquid crystal panel 110.

The light guide plate 123 is formed of a transparent material and has a flat surface. For example, the light guide plate 123 may be formed of an acryl-based plastic material, e.g., polymethylmethacrylate (PMMA), or a polycarbonate-based material.

To provide a uniform plane light source, the light guide plate 123 may include patterns on a rear side surface. For example, the pattern on the rear side surface of the light guide plate 123 is an elliptical pattern, a polygonal pattern, or a hologram pattern.

The reflective sheet 125 is disposed at a rear side of the light guide plate 123. The light passing through a rear side surface of the light guide plate 123 is reflected on the reflective sheet 125 such that light brightness provided into the liquid crystal panel 110 is improved.

The optical sheet 121 includes a plurality of sheets, e.g., a diffusion sheet and at least one light-concentration sheet. The light dispersed through the light guide plate 123 is diffused and/or/concentrated by the optical sheet 121 such that a uniform planar light source can be projected onto the liquid crystal panel 110.

The diffusion sheet is disposed directly over the light guide plate 123 to diffuse the light from the light guide plate 123. The light is directed by the diffusion sheet toward the light-concentration sheet.

The diffused light from the diffusion sheet is concentrated toward the liquid crystal panel 110 by the light-concentration sheet. Most of the light from the light-concentration sheet is substantially perpendicular to the liquid crystal panel 110.

Alternatively, the optical sheet 121 may be a multi-functional optical sheet having both diffusing and light-concentration functions. The optical sheet 121 may have a laminated structure including the diffusion sheet and the light-concentration sheet.

For instance, the multi-functional optical sheet may include a base substrate of a transparent material, a diffusion layer, which is disposed on the base layer, for light diffusion, and a light-concentration layer, which is disposed on the diffusion layer, for light concentration.

The liquid crystal panel 110 and the backlight unit 120 are combined with the main frame 130 and the bottom frame 150 for assembly. The liquid crystal panel 110 and the backlight unit 120 are disposed on and over the bottom frame 150. The bottom frame 150 includes a horizontal surface 151 and a side surface 153 upwardly protruding from edges of the horizontal surface 151. For example, the side surface 153 vertically protrudes. The rear side of the backlight unit 120 is covered by the horizontal surface 151 of the bottom frame 150.

The main frame 130 surrounds side surfaces of the backlight unit 120. The liquid crystal panel 110 is attached and fixed to the main frame 130. The main frame 130 includes a first guide portion 130a and a second guide portion 130b facing and opposite to the first guide portion 130a. The LED assembly 129 is disposed in the first guide portion 130a.

When edges of the liquid crystal panel 110 are defined as first to fourth edges, the LED assembly 129 corresponds to the first edge, and the second edge faces opposite to the first edge. The third and fourth edges are perpendicular to the first and second edges and face each other. The first and second guide portions 130a and 130b are separated from each other and correspond to the first and second edges, respectively. The first and second guide portions 130a and 130b each has a bar shape.

The backlight unit 120 is disposed between the first and second guide portions 130a and 130b, and two opposite side surfaces of the backlight unit 120 are covered by the first and second guide portions 130a and 130b. The liquid crystal panel 110 is attached on and fixed to the first and second guide portions 130a and 130b.

Since there is no main frame along the third and fourth edges of the liquid crystal panel 110, a narrow bezel structure may minimize the non-display area of the LCD device.

Figure 3A:
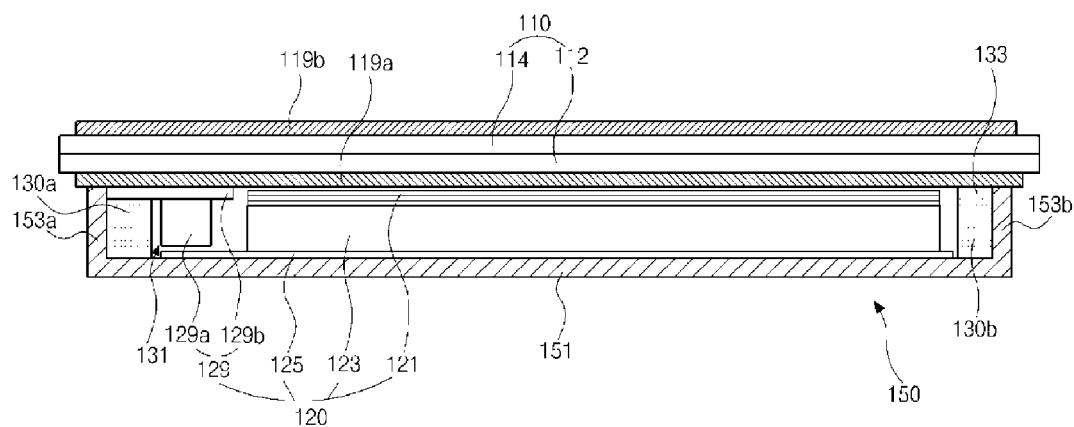
FIGS. 3A and 3B are cross-sectional views along the lines III-III and III'-III' in FIG. 1, respectively.
Figure 3B:
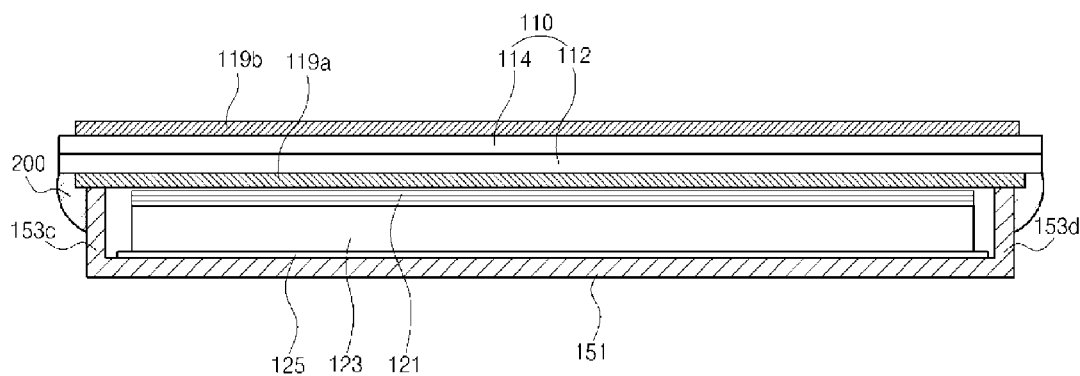

The bottom edge surfaces of the liquid crystal panel 110 in the third and fourth edges are fixed to the side surface 153 of the bottom frame 150 using an adhesive such as glue, as described further with respect to FIG. 3B. Accordingly, the liquid crystal panel 110 is securely assembled with the bottom frame 150 without a main frame along the third and fourth edges.

The main frame 130 may be referred to as a guide panel, a main support, or a mold frame, and the bottom frame 150 may be referred to as a cover bottom, a bottom cover, or a lower cover.

As illustrated above, the LCD device of the present invention does not require a top frame covering front edges of the liquid crystal panel 110, which reduces the thickness and weight of the LCD device and simplifies the assembly process. In addition, the production costs of the LCD device are reduced.

Moreover, the display area of the LCD device is increased and the bezel (which is a non-display area of the LCD device) is decreased by eliminating the top frame. In other words, the LCD device is a narrow bezel LCD device.

The main frame 130 includes separated first and second guide portions 130a and 130b corresponding to the first and second edges of the liquid crystal panel 110 without portions corresponding to the third and fourth edges of the liquid crystal panel 110. As a result, the bezel of the LCD device is further narrowed.

In addition, since the third and fourth edges of the liquid crystal panel 110 are attached and fixed to the side surfaces 153 of the bottom frame 150, the LCD device is securely assembled.

Figure 2:
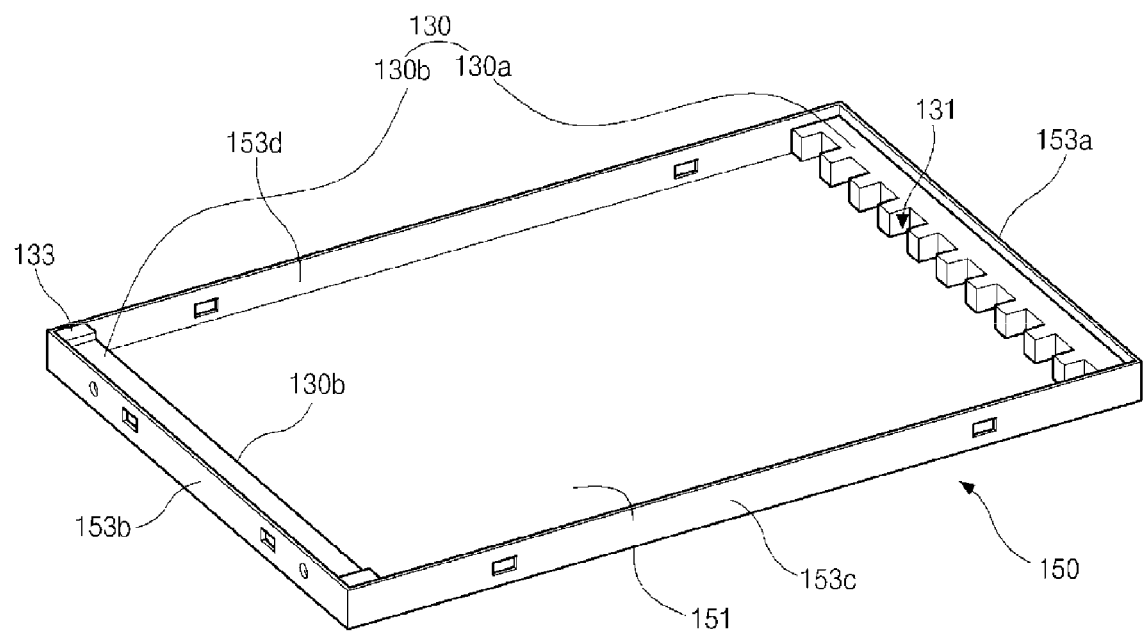
FIG. 2 is a schematic perspective view of a main frame with a bottom frame.

FIG. 2 is a schematic perspective view of a main frame with a bottom frame.

As shown in FIG. 2, the bottom frame 150 includes the horizontal surface 151 and first to fourth side surfaces 153a to 153d vertically protruding from the horizontal surface 151. The first to fourth side surfaces 153a to 153d of the bottom frame 150 correspond to the first to fourth edges of the liquid crystal panel 110, respectively.

The LED assembly 129 (of FIG. 1) is positioned to correspond to the first side surface 153a and the first edge of the liquid crystal panel 110. The first guide portion 130a of the main frame 130 is positioned on an inner side of the first side surface 153a, and the second guide portion 130b of the main frame is positioned on an inner side of the second side surface 153b.

The first guide portion 130a has a length corresponding to a length of the first side surface 153a of the bottom frame 150 and includes an LED guide groove 131 for the LED 129a (of FIG. 1). Each LED 129a is inserted into each LED guide groove 131 such that three sides of the LED 129a are surrounded by the first guide portion 130a. The LED assembly 129 is attached on and fixed to the first guide portion 130a.

Namely, the LED 129 is arranged and mounted on a surface of the PCB 129b (of FIG. 1) and is inserted into the LED groove 131 of the first guide portion 130a. The surface of the PCB 129b, where the LED 129 is arranged, is attached on and fixed to an upper surface of the first guide portion 130a.

As a result, the LED assembly 129 has a fixed position in the LCD device by the first guide portion 130a.

The second guide portion 130b has a length corresponding to a length of the second side surface 153b of the bottom frame 150, and a protrusion 133, which vertically protrudes from an upper surface of the second guide portion 130b, is positioned at both ends of the second guide portion 130b. The liquid crystal panel 110 is disposed on and supported by the protrusion 133. The protrusion 133 has substantially the same thickness as the PCB 129b of the LED assembly 129.

As illustrated above, the LED assembly 129 is attached to the first guide portion 130a by attaching the surface of the PCB 129b, where the LED 129a is arranged, to the upper surface of the first guide portion 130a, and the first edge of the liquid crystal panel 110 is attached to an opposite surface of the PCB 129b and supported by the LED assembly 129. In addition, the second edge of the liquid crystal panel 110 is attached to and supported by the protrusion 133 of the second guide portion 130b. In this instance, the opposite surface (i.e., an upper surface) of the PCB 129b and the protrusion 133 have substantially the same height from the horizontal surface 151 of the bottom frame 150. In addition, the first to fourth side surfaces 153a to 153d of the bottom frame 150 have substantially the same height from the horizontal surface 151 of the bottom frame 150 as the protrusion 133 and the PCB 129b. As a result, the liquid crystal panel 110 is securely attached and fixed to the PCB 129b and the protrusion 133 without an inclination or a gap. In other words, the opposite surface of the PCB 129b and the protrusion 133 form one horizontal plane.

The first and second guide portions 130a and 130b, which are separated from each other and respectively positioned at the first and second side surfaces 153a and 153b of the bottom frame 150, form the main frame 130 without portions at the third and fourth side surfaces 153c and 153c of the bottom frame 150. Accordingly, the non-display region at the third and fourth edges of the liquid crystal panel is minimized to provide a narrow bezel LCD device.

FIGS. 3A and 3B are cross-sectional views along the lines III-III and III'-III' in FIG. 1, respectively, according to a first embodiment of the present invention.

As shown in FIGS. 3A and 3B, in the LCD device, the reflective sheet 125, the light guide plate 123, the LED assembly 129, which includes the LED 129a and the PCB 129b and is positioned at one side of the light guide plate 123, and the optical sheet 121 on the light guide plate 123 constitute the backlight unit 120. The liquid crystal panel 110, which includes the first and second substrates 112 and 114 and the liquid crystal layer (not shown) therebetween, is disposed over the backlight unit 120. The first and second polarizing plates 119a and 119b for selectively transmitting light are positioned on respective outer sides of the first and second substrates 112 and 114.

The sides of the backlight unit 120 and the liquid crystal panel 110 are surrounded by the main frame 130, which includes the first and second guide portions 130a and 130b, and the bottom frame 150, which covers a rear side of the backlight unit 120 and is attached to the main frame 130.

As shown in FIG. 3A, two opposite sides of the backlight unit 120 are surrounded by the main frame 130, and the LED 129a of the LED assembly 129 is inserted into the guide groove 131 formed in the first guide portion 130a of the main frame 130 such that the light from the LED 129a is incident toward the light guide plate 123. The PCB 129b is attached and fixed to the upper surface of the first guide portion 130a using an adhesive material such as double-faced tape.

The liquid crystal panel 110 is attached to and supported by the PCB 129b, the protrusion 133 of the second guide portion 130b, and an upper surface of each of the first to fourth side surfaces 153a to 153d.

As shown in FIG. 3B, the other two opposite sides of the backlight unit 120 are surrounded by the third and fourth side surfaces 153c and 153d of the bottom frame 150 without the main frame 130. The first side of the light guide plate 123 faces the LED 129a or the first guide portion 130a of the main frame 130, and the second side of the light guide plate 123 faces the second guide portion 130b of the main frame 130. The third and fourth sides of the light guide plate 123 face the third and fourth side surfaces 153c and 153d of the bottom frame 150, respectively.

The liquid crystal panel 110, which is attached and fixed to the PCB 129b, the protrusion 133 of the second guide portion 130b, and the upper surface of each of the first to fourth side surfaces 153a to 153d, has a size larger than the bottom frame 150 such that edges of the liquid crystal panel 110 protrude beyond the bottom frame 150. Namely, the edges of the liquid crystal panel 110 protrude beyond the first to fourth side surfaces 153a to 153d. The rear edges of the liquid crystal panel 110 and an outer side of the side surfaces of the bottom frame 150 are attached by an adhesive 200 such as glue. For example, the adhesive 200 may be formed at the third and fourth side surfaces 153c and 153d but not at the first and second side surfaces 153a and 153b because there is no main frame 130 in the third and fourth side surfaces 153c and 153d.

Since the third and fourth edges of the liquid crystal panel 110 are attached to the third and fourth side surfaces 153c and 153d by the adhesive 200 without the main frame 130, the assembly of the LCD device is secured and the bezel of the LCD device is decreased.

The positioning and/or coverage of the adhesive 200 in the third and fourth edges of the liquid crystal panel 110 are explained with respect to second and third embodiments.

Figure 4:
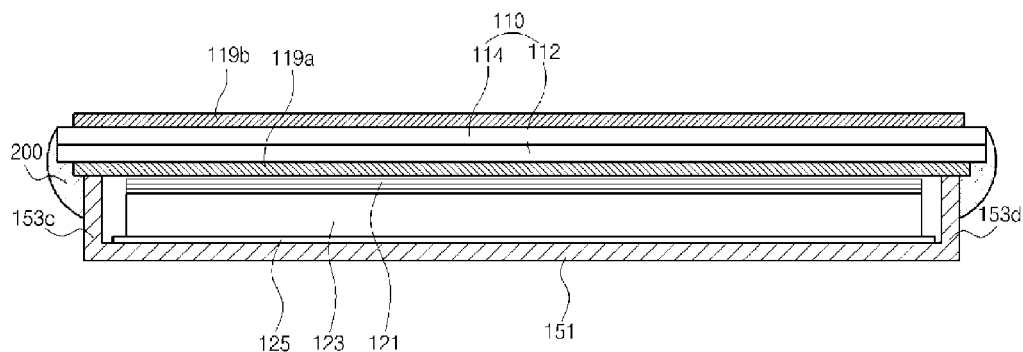
FIG. 4 is a cross-sectional view along the line III'-III' in FIG. 1 of an LCD device according to a second embodiment of the present invention.

FIG. 4 is a cross-sectional view along the line III'-III' in FIG. 1 of an LCD device according to a second embodiment of the present invention.

As shown in FIG. 4, in the LCD device, the reflective sheet 125, the light guide plate 123, the LED assembly 129, which includes the LED 129a and the PCB 129b and is positioned at one side of the light guide plate 123, and the optical sheet 121 on the light guide plate 123 constitute the backlight unit 120. The liquid crystal panel 110, which includes the first and second substrates 112 and 114 and the liquid crystal layer (not shown) therebetween, is disposed over the backlight unit 120. The first and second polarizing plates 119a and 119b for selectively transmitting light are positioned on outer sides of the first and second substrates 112 and 114.

The sides of the backlight unit 120 and the liquid crystal panel 110 are surrounded by the main frame 130 (of FIG. 2), which includes the first and second guide portions 130a and 130b, and the bottom frame 150, which covers a rear side of the backlight unit 120 and is attached to the main frame 130.

The liquid crystal panel 110 has a size larger than the bottom frame 150 such that edges of the liquid crystal panel 110 protrude beyond the bottom frame 150. The protruding edges of the liquid crystal panel 110 and an outer side of the third and fourth side surfaces 153c and 153d of the bottom frame 150 are attached with an adhesive 200 such as glue. Namely, the protruding edges liquid crystal panel 110 are attached and fixed to the third and fourth side surfaces 153c and 153d of the bottom frame 150 by the adhesive 200.

In the LCD device of the second embodiment, the adhesive 200 covers the side of the liquid crystal panel 110. Namely, the adhesive 200 is formed to cover the side surface of the first and second substrates 112 and 114 of the liquid crystal panel 110, the exposed rear edge of the first substrate 112, the exposed rear edge of the first polarizing plate 119a, the side surface of the first polarizing plate 119a, and the outer side of the third and fourth side surfaces 153c and 153d of the bottom frame 150.

The adhesive 200 has a black color and covers the side surface of the liquid crystal panel 110 such that light leakage from the side surface of the liquid crystal panel 110 is prevented or reduced due to the adhesive 200. Namely, the adhesive 200 is formed of a material that is highly light absorbing.

In addition, since the area of the adhesive 200 in the second embodiment is increased relative to that of the adhesive 200 in the first embodiment (where the adhesive 200 covers the rear edge of the liquid crystal panel 110 except the side surface of the liquid crystal panel 110), the adhesion of the adhesive 200 is improved to more securely attach the liquid crystal panel 110 to the bottom frame 150.

In this instance, the thickness of the adhesive 200 at the side surface of the liquid crystal panel 110 is less than about 0.1 mm such that the resulting increase in the bezel of the LCD device is minimized without light leakage (and while maintaining secure assembly).

Figure 5:
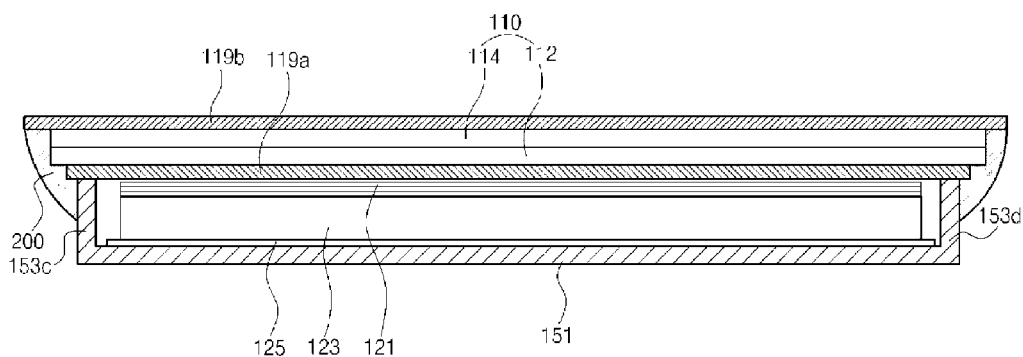
FIG. 5 is a cross-sectional view along the line III'-III' in FIG. 1 of an LCD device according to a third embodiment of the present invention.

FIG. 5 is a cross-sectional view along the line III'-III' in FIG. 1 of an LCD device according to a third embodiment of the present invention.

As shown in FIG. 5, in the LCD device, the reflective sheet 125, the light guide plate 123, the LED assembly 129, which includes the LED 129a and the PCB 129b and is positioned at one side of the light guide plate 123, and the optical sheet 121 on the light guide plate 123 constitute the backlight unit 120. The liquid crystal panel 110, which includes the first and second substrates 112 and 114 and the liquid crystal layer (not shown) therebetween, is disposed over the backlight unit 120. The first and second polarizing plates 119a and 119b for selectively transmitting light are positioned on outer sides of the first and second substrates 112 and 114.

The sides of the backlight unit 120 and the liquid crystal panel 110 are surrounded by the main frame 130 (of FIG. 2), which includes the first and second guide portions 130a and 130b, and the bottom frame 150, which covers a rear side of the backlight unit 120 and is attached to the main frame 130.

The liquid crystal panel 110 has a size larger than the bottom frame 150 such that edges of the liquid crystal panel 110 protrude beyond the bottom frame 150. The protruding edges of the liquid crystal panel 110 and an outer side of the third and fourth side surfaces 153c and 153d of the bottom frame 150 are attached with an adhesive 200 such as glue. Namely, the protruding edges liquid crystal panel 110 are attached and fixed to the third and fourth side surfaces 153c and 153d of the bottom frame 150 by the adhesive 200.

In the LCD device of the third embodiment, the second polarizing plate 119b at an outer side of the second substrate 114 of the liquid crystal panel 110 has a size larger than the liquid crystal panel 110. Namely, a rear edge of the second polarizing plate 119b protrudes beyond the liquid crystal panel 110. In this instance, the sides of the second polarizing plate 119b corresponding to the third and fourth side surfaces 153c and 153d of the bottom frame 150 protrude beyond the liquid crystal panel 110, while the sides of the second polarizing plate 119b corresponding to the first and second side surfaces 153a and 153b of the bottom frame 150 may not protrude beyond the liquid crystal panel 110. Namely, ends of the second polarizing plate 119b corresponding to the first and second side surfaces 153a and 153b of the bottom frame 150 may be positioned in the liquid crystal panel 110. The adhesive 200 covers from the rear edge of the second polarizing plate 119b to the outer side of the third and fourth side surfaces 153c and 153d of the bottom frame 150.

Namely, the adhesive 200 is formed to cover the rear edge of the second polarizing plate 119b, the side surface of the first and second substrates 112 and 114 of the liquid crystal panel 110, the exposed rear edge of the first substrate 112, the exposed rear edge of the first polarizing plate 119a, the side surface of the first polarizing plate 119a, and the outer side of the third and fourth side surfaces 153c and 153d of the bottom frame 150.

The adhesive 200 has a black color and covers the side surface of the liquid crystal panel 110 such that light leakage from the side surface of the liquid crystal panel 110 is prevented or reduced due to the adhesive 200.

In addition, since the area of the adhesive 200 in the third embodiment is increased relative to that of the adhesive 200 in the first embodiment (where the adhesive 200 covers the rear edge of the liquid crystal panel 110 except the side surface of the liquid crystal panel 110), the liquid crystal panel 110 is more securely attached to the bottom frame 150.

Moreover, since the exposed edge of the second polarizing plate 119*b* serves as a dam in the process of coating a liquid phase material for the adhesive 200, the process efficiency for applying the adhesive 200 is improved.

Furthermore, since the second polarizing plate 119*b* has the larger size than the liquid crystal panel 110, the end of the second polarizing plate 119*b* is not positioned in the display area of the liquid crystal panel 110. Namely, the top frame covering front edges of the liquid crystal panel 110 and the front edges of the second polarizing plate 119*b* is unnecessary. As a result, the LCD device is a clear borderless type LCD device without a border between the image display screen and the frame.

As explained above, since the LCD device of the present invention does not require the top frame, a thin and light-weight LCD device is provided and the assembly process is simplified. Production costs are also reduced.

In addition, without the top frame, the display area is increased and the non-display area is decreased such that a narrow bezel LCD device is provided.

Moreover, the main frame 130 includes separated first and second guide portions 130*a* and 130*b* corresponding to the first and second edges of the liquid crystal panel 110 without portions corresponding to the third and fourth edges of the liquid crystal panel 110. As a result, the bezel of the LCD device is further narrowed. The third and fourth edges of the liquid crystal panel 110 without the portions of the main frame 130 are attached and fixed to the third and fourth side surfaces 153*c* and 153*d* of the bottom frame 150 by the adhesive 200 for secure assembly of the LCD device.

Furthermore, the adhesive 200 has a black color and covers the side surface of the liquid crystal panel 110 such that light leakage from the side surface of the liquid crystal panel 110 is prevented or reduced due to the adhesive 200. Since the second polarizing plate 119*b* has a larger size than the liquid crystal panel 110, the process efficiency for applying the adhesive 200 is improved and a clear borderless type LCD device is provided.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal panel including first and second substrates and a liquid crystal layer between the first and second substrates;
   a bottom frame including a horizontal surface and first, second, third, and fourth side surfaces, the first side surface corresponding to a first edge of the liquid crystal panel and being opposite to the second side surface, wherein the liquid crystal panel has a size larger than the bottom frame such that a side of the liquid crystal panel protrudes beyond the bottom frame;
   a main frame including:
      a first guide portion corresponding to the first edge, the first guide portion including a guide groove, and
      a second guide portion corresponding to a second edge of the liquid crystal panel opposite to the first edge;
   a backlight unit under the liquid crystal panel, the backlight unit including:
      a light emitting diode (LED) assembly corresponding to the first edge of the liquid crystal panel,
      a printed circuit board (PCB), and
      an LED arranged on the PCB and inserted into the guide groove of the first guide portion; and
   an adhesive covering at least a portion of the side of the liquid crystal panel and an outer side of the third and fourth side surfaces.

2. The device according to claim 1, wherein the adhesive is formed of a material that is highly light absorbing.

3. The device according to claim 1, further comprising:
   a first polarizing plate on an outer side of the first substrate and disposed between the liquid crystal panel and the backlight unit; and
   a second polarizing plate on an outer side of the second substrate, two opposite edges of the second polarizing plate protruding beyond the liquid crystal panel.

4. The device according to claim 3, wherein the adhesive covers a rear surface of the two opposite edges of the second polarizing plate, the side of the liquid crystal panel, a rear surface of the liquid crystal panel, and the outer side of the third and fourth side surfaces of the bottom frame.

5. The device according to claim 4, wherein the other two opposite edges of the second polarizing plate are positioned to not protrude relative to the first and second edges of the liquid crystal panel.

6. The device according to claim 4, wherein the adhesive at the side of the liquid crystal panel has a thickness less than 0.1 mm.

7. The device according to claim 1, further comprising a protrusion on an upper surface of the second guide portion, the protrusion positioned at an end of the second guide portion, wherein the PCB is attached on an upper surface of the first guide portion and has a substantially same height from the horizontal surface as the protrusion has from the horizontal surface.

8. The device according to claim 7, wherein the liquid crystal panel is attached to the PCB and the protrusion.

9. The device according to claim 8, wherein the first, second, third, and fourth side surfaces have substantially same heights from the horizontal surface as the protrusion has from the horizontal surface.

10. The device according to claim 1, wherein the backlight unit further includes:
    a reflective sheet on the horizontal surface;
    a light guide plate on the reflective sheet; and
    an optical sheet on the light guide plate,
    wherein the LED assembly is positioned at a first side surface of the light guide plate.

11. The device according to claim 10, wherein a second side surface of the light guide plate faces the second guide portion, and third and fourth side surfaces of the light guide plate face the third and fourth side surfaces of the bottom frame.

12. A liquid crystal display device, comprising:
    a liquid crystal panel including first and second substrates and a liquid crystal layer between the first and second substrates;
    a backlight unit under the liquid crystal panel;
    a bottom frame including a horizontal surface and first, second, third, and fourth side surfaces, the first side surface corresponding to a first edge of the liquid crystal panel and being opposite to the second side surface, the liquid crystal panel having a size larger than the bottom frame such that a side of the liquid crystal panel protrudes outward beyond the bottom frame;
a main frame positioned inside the bottom frame, the main frame including:
   a first guide portion corresponding to the first edge of the liquid display panel and corresponding to the first side surface of the bottom frame, and
   a second guide portion corresponding to a second edge of the liquid crystal panel opposite to the first edge and corresponding to the second side surface of the bottom frame;
a first polarizing plate on an outer side of the first substrate and disposed between the liquid crystal panel and the backlight unit;
a second polarizing plate on an outer side of the second substrate, two opposite edges of the second polarizing plate protruding beyond the liquid crystal panel; and
an adhesive covering an outer side of the third and fourth side surfaces and at least a portion of the side of the liquid crystal panel protruding outward beyond the bottom frame.

13. The device according to claim 12, wherein the adhesive covers a side surface of the liquid crystal panel protruding outward beyond the bottom frame.

14. The device according to claim 13, wherein the adhesive covers a rear surface of the second polarizing plate proximate to the two opposite edges.

15. The device according to claim 14, wherein two other opposite edges of the second polarizing plate are positioned to not protrude relative to the first and second edges of the liquid crystal panel.

16. The device according to claim 13, wherein the adhesive at the side of the liquid crystal panel has a thickness less than 0.1 mm.

17. The device according to claim 12, wherein the adhesive is formed of a material that is highly light absorbing.

18. A liquid crystal display device, comprising:
a liquid crystal panel including first and second substrates and a liquid crystal layer between the first and second substrates;
a backlight unit under the liquid crystal panel;
a bottom frame including a horizontal surface and first, second, third, and fourth side surfaces, the first side surface corresponding to a first edge of the liquid crystal panel and being opposite to the second side surface, wherein the liquid crystal panel has a size larger than the bottom frame such that a side of the liquid crystal panel protrudes outward beyond the bottom frame;
a main frame positioned inside the bottom frame, the main frame including a first guide portion corresponding to the first edge and a second guide portion corresponding a second edge of the liquid crystal panel opposite to the first edge; and
an adhesive covering at least a portion of the side of the liquid crystal panel and an outer side of the third and fourth side surfaces.

19. The device according to claim 18, wherein the first guide portion includes a guide groove, wherein the backlight unit includes an LED, and wherein the LED is inserted into the guide groove.

* * * * *